Jan. 15, 1924.

P. T. KING

ELECTRIC MOTOR

Filed April 30, 1923   2 Sheets-Sheet 1

1,481,213

INVENTOR.
Percy Thomas King.
by Arthur Cushman
Attorney.

Jan. 15, 1924.

P. T. KING 1,481,213

ELECTRIC MOTOR

Filed April 30, 1923    2 Sheets-Sheet 2

INVENTOR.
Percy Thomas King
by Arthur J. Caphun
Attorney.

Patented Jan. 15, 1924.

1,481,213

UNITED STATES PATENT OFFICE.

PERCY T. KING, OF LUTON, ENGLAND.

ELECTRIC MOTOR.

Application filed April 30, 1923. Serial No. 635,708.

*To all whom it may concern:*

Be it known that I, PERCY THOMAS KING, a subject of the King of Great Britain and Ireland, residing at 17a Manchester Street, Luton, Bedfordshire, England, have invented new and useful Improvements in Electric Motors (on which application has been made for Letters Patent in Great Britain, No. 193,580, filed 19th December, 1921, and in Germany, filed 20th March, 1923), of which the following is a specification.

The present invention relates to an improved method of starting, stopping and controlling electric motors and more particularly those electric motors in which both members of the motor are adapted to rotate the motor frame being fitted with armature bearings, field coils and other motor parts and controlled by band brake mechanism, in such a manner as to permit of the armature rotating at variable speeds in an opposite direction to that of the field frame. An alternating current electric induction motor has been suggested more particularly designed for driving trams, in which the vehicle brake is constituted by a band brake on the rotor of the motor while a similar brake is provided for the spinner of the motor. These brake bands are operated through levers by a common handle and so arranged that normally the weight of the handle, or a spring, keeps the brake applied to the spinner in engagement and the brake applied to the rotor released. Upon the lifting of the handle to a limited extent, both brakes are released, whilst a further elevation of the handle causes the rotor brake to be applied to retard the vehicle without again applying the spinner brake.

The present invention is designed more particularly to provide an electric motor suitable for the purpose of driving small machines such as sewing machines which are usually fitted with a foot control.

The present invention comprises a variable speed control for an electric motor, in which both the field magnet and armature members are rotatable and each member is brake controlled, both brakes being operated through one lever arm and each brake being adjusted so that the brake tension of one of said brakes is dependent on the amount of brake tension of the other brake and consequently as the brake on one member is increased the brake on the other member is decreased at the same time. In order to prevent excessive over-loading, the brake blocks are spring-controlled and their tension adjustable.

My invention is illustrated by way of example in the accompanying drawings, in which—

Figure 1:
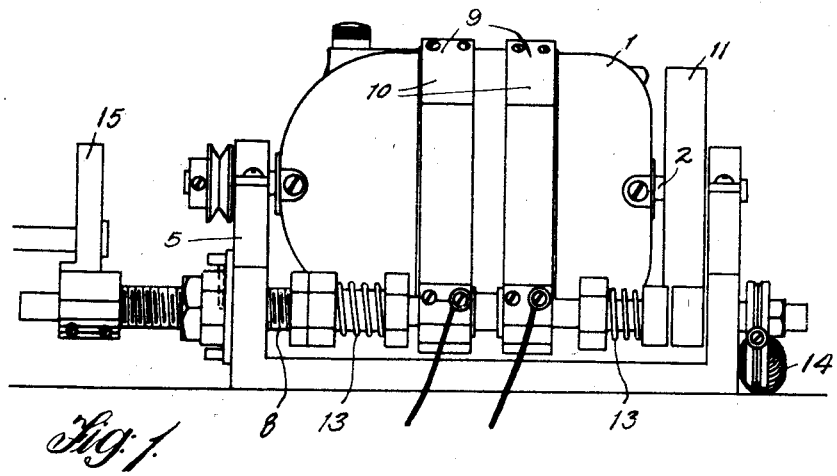
Figure 1 shows a side view of a motor of the type described, fitted with the brake mechanism of my invention.
Figure 2:
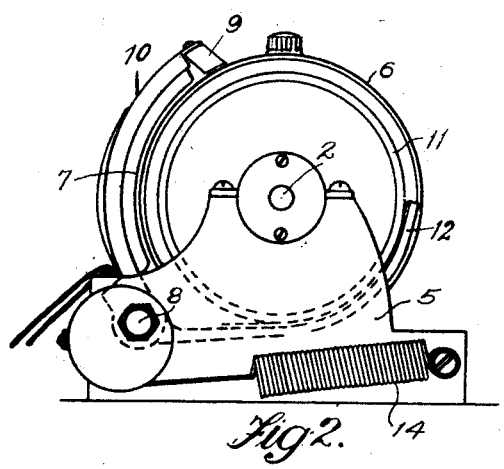
Figure 2 shows an end view of Figure 1.
Figure 3:
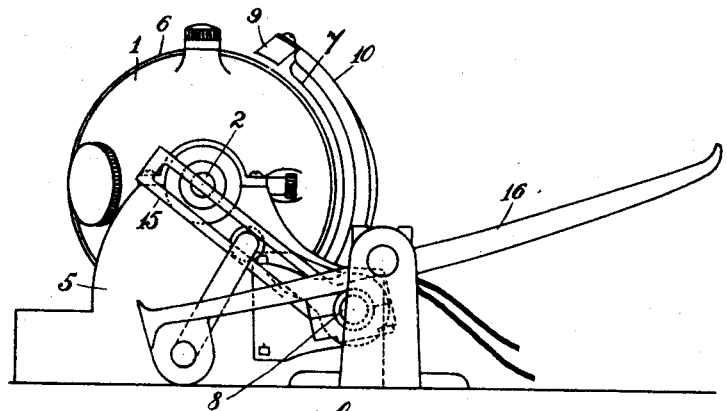
Figure 3 shows an end view of Figure 1 taken from the opposite end to Figure 2.
Figure 4:
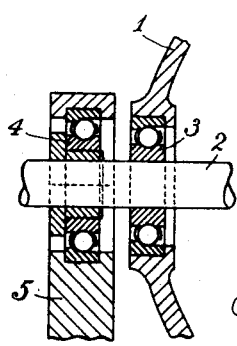
Figure 4 shows a sectional view of the bearings.

Referring now to the drawings, the field frame 1 carrying the brush gear and end plates is rotatably mounted on the armature shaft 2 by means of ball bearings 3 housed in the end plates. The armature shaft is carried in ball bearings 4 housed in a fixed framework 5. The field frame 1 is provided with slip rings 6 shrunk onto the frame over an insulating covering of mica or the like. Brakes 7 pivoted on a shaft 8 co-act with the slip rings, and brushes 9 mounted on springs 10 behind the brakes 7 also co-act with the slip rings and serve to supply the current to the motor. When the brakes 7 are disengaged the circuit will be broken in the manner of a double pole switch. A brake disc 11 is secured to the armature shaft 2 and a brake 12 pivoted on the shaft 8 co-acts therewith. The brakes 7 and 12 are connected to the shaft 8 through springs 13 so that as the shaft 8 is turned one brake is applied while the other is released the tension of one increasing and of the other decreasing. The provision of springs enables the field to slip if the motor is overloaded. A spring 14 is connected so that the brake 12 is normally held in engagement. A lever 15 secured to the shaft 8 enables the brakes to be operated and this may conveniently be controlled by a treadle 16 when the motor is used for driving sewing machines or similar mechanism.

It will be noted that the above described brake mechanism is applied to a motor in which the field magnet and armature member are rotatable and each member is brake-controlled, both brakes or sets of brakes being operated from one lever arm and each brake being adjusted so that the brake tension of one of the brakes is dependent on the amount of brake tension of the other brake and, consequently, as the brake on one member of the motor is increased, the brake on the other member is decreased at the same time. A very sensitive variable speed control is thus obtained, since as the brake is increased on one rotatable member the speed of this member is reduced and the speed of the opposite member increased. The brake tension on that member which is used for regulating or the opposite member to the driving member is spring-controlled, and consequently allows of the said stationary member to rotate when the motor is overloaded.

It should be understood that, if desired, the field frame may be used for the drive instead of the armature.

What I claim is:—

1. A variable speed control for electric motors, comprising a framework, bearings therein carrying the whole motor, slip rings on the field magnet, brushes carried in said framework co-acting with said slip rings, a brake co-acting with said field magnet and adapted when disengaged to lift said brushes out of contact with said slip rings, a brake co-acting with the armature of said motor, and a single arm operating both said brakes so that the brake tension of one of said brakes is dependent on the amount of brake tension of the other brake and consequently as the braking force of one brake is increased that of the other is decreased.

2. A variable speed control for electric motor, comprising a framework, bearings therein carrying the whole motor, slip rings on the field magnet, brushes carried in said framework co-acting with said slip rings, a brake co-acting with said field magnet and adapted when disengaged to lift said brushes out of contact with said slip rings, a brake co-acting with the armature of said motor, a single arm mounted on said framework operating both said brakes, and spring means co-acting with said arm and said brakes so that the brake tension of one of said brakes is dependent on the amount of brake tension on the other brake and consequently as the braking force of one brake is increased that of the other is decreased and so that the field magnet can rotate when the motor is overloaded.

3. A variable speed control for electric motors, comprising a framework, bearings therein carrying the whole motor by the armature shaft, slip rings on the field magnet, brushes carried in said framework co-acting with said slip rings, a brake co-acting with said slip rings and brushes so that when said brake is disengaged the brushes are lifted out of contact with the slip rings, a brake disc on said armature shaft, a brake co-acting with said brake disc, and a single arm operating both said brakes so that the brake tension of one of said brakes is dependent on the amount of brake tension of the other brake and consequently as the braking force of one brake is increased that of the other is decreased.

4. A variable speed control for electric motors, comprising a framework, bearings therein carrying the whole motor by the armature shaft, slip rings on the field magnets, a shaft parallel with said armature shaft carried in said framework, brushes yieldably carried on said shaft co-acting with said slip rings, brakes yieldably mounted on said shaft adapted to co-act with said slip rings so that, when disengaged, they move said brushes out of contact with said slip rings and so that the field magnet can rotate when the motor is overloaded, a brake disc mounted on said armature shaft, a brake yieldably mounted on said parallel shaft adapted to co-act with said brake disc on the opposite side to the said field magnet brakes, spring means co-acting with said parallel shaft and said framework so as normally to hold said field magnet brakes in action, and an operating arm attached to said parallel shaft adapted on movement to move said armature brake into action as it moves said field magnet brakes out of action.

5. A variable speed control for electric motors, comprising a framework, bearings therein carrying the whole motor by the armature shaft, slip rings on the field magnet of said motor, a shaft parallel with said armature shaft carried in said framework, brakes rotatably mounted on said parallel shaft adapted to co-act with said slip rings, a spring adjustably attached to said parallel shaft, connecting said parallel shaft with said brakes so that the field magnet can rotate when the motor is overloaded, leaf springs attached to said brakes, brushes mounted on said leaf springs adapted to co-act with said slip rings and be lifted out of contact by said brakes in their off position, a brake disc on said armature shaft, an armature brake rotatably mounted on said parallel shaft on opposite side to said field magnet brakes, a spring adjustably attached to said parallel shaft connecting said parallel shaft with said armature brake, an adjustable member on said parallel shaft, a spring connecting said adjustable member with said framework so as normally to hold said field magnet brakes in action, a second framework, a foot pedal mounted thereon, a lever carried by said foot pedal and a single arm slotted to receive and be operated by said lever, attached to said parallel shaft, adapted when operated to move said armature brake into action as it moves said field magnet brakes out of action.

In witness whereof I have signed my name to this specification.

P. T. KING.